Figure 1:
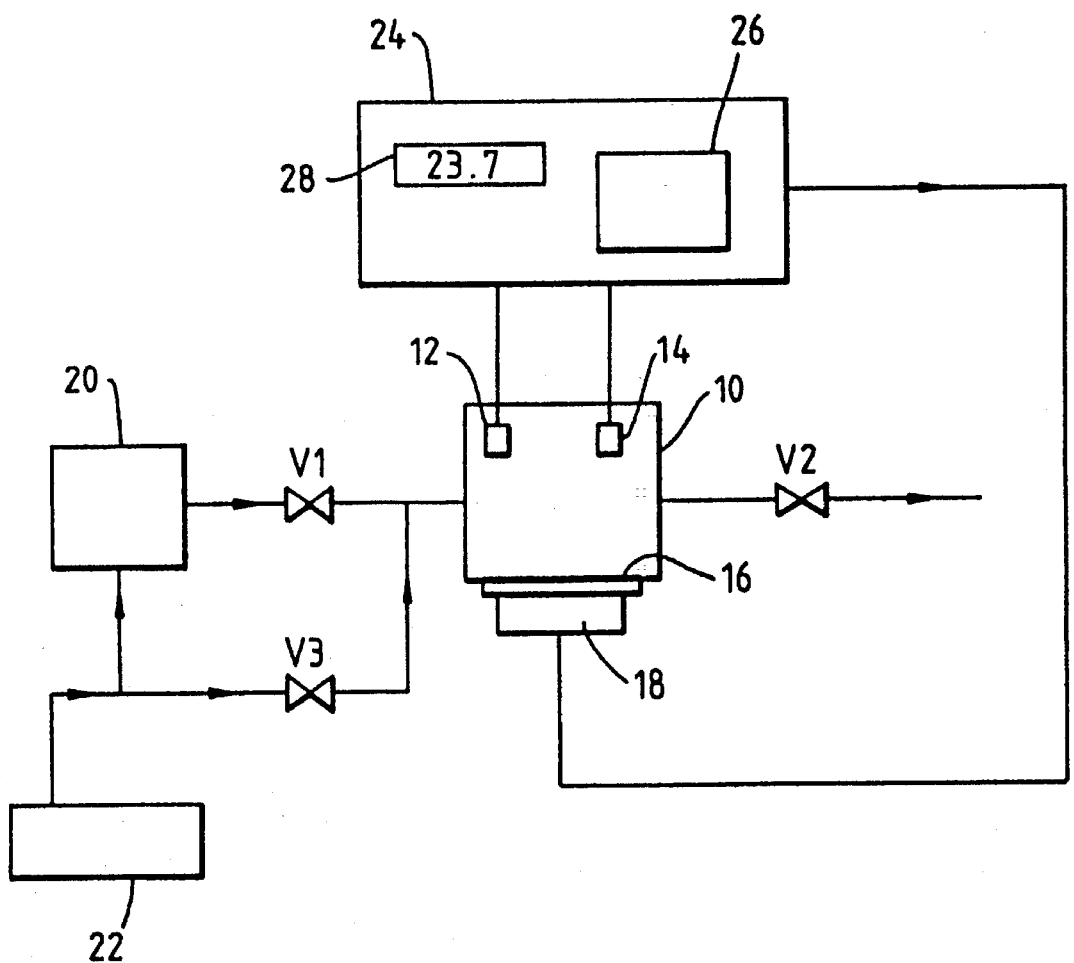

United States Patent [19]

Dadachanji

[11] Patent Number: 5,469,707

[45] Date of Patent: Nov. 28, 1995

[54] APPARATUS FOR, AND METHOD OF, PROVIDING AN ATMOSPHERE OF PREDETERMINED HUMIDITY

[75] Inventor: Fali M. Dadachanji, Marlow, Great Britain

[73] Assignee: Protimeter PLC, United Kingdom

[21] Appl. No.: 140,196

[22] PCT Filed: May 20, 1992

[86] PCT No.: PCT/GB92/00910

§ 371 Date: Nov. 5, 1993

§ 102(e) Date: Nov. 5, 1993

[87] PCT Pub. No.: WO92/21080

PCT Pub. Date: Nov. 26, 1992

[30] Foreign Application Priority Data

May 22, 1991 [GB] United Kingdom ............... 9111065

[51] Int. Cl.[6] ............................ F25B 21/02; F25D 17/06
[52] U.S. Cl. ............................ 62/3.3; 62/93; 62/176.6
[58] Field of Search ............................ 236/44 A, 44 R; 62/176.1, 176.6, 93, 3.3

[56] References Cited

U.S. PATENT DOCUMENTS

| 1,819,643 | 8/1931 | Fleisher | 236/44 R |
| 2,754,063 | 7/1956 | Kersten | 236/44 A |
| 3,532,270 | 10/1970 | Schoen, Jr. | 236/44 R |
| 4,356,834 | 11/1982 | LeMay | 137/89 |
| 5,056,547 | 10/1991 | Brownawell | 236/44 R |

FOREIGN PATENT DOCUMENTS

| 501831 | 6/1979 | Australia . |
| 574009 | 6/1988 | Australia . |
| 598532 | 6/1990 | Australia . |
| 2606900 | 3/1988 | France . |

*Primary Examiner*—William E. Wayner
*Attorney, Agent, or Firm*—Kelly, Bauersfeld & Lowry

[57] ABSTRACT

An apparatus for providing an atmosphere of predetermined humidity comprises a chamber 10, a source 22 of dry air, leading to the chamber 10 directly via a valve V3 and a saturator 20 having an inlet connected with the source 22 and an outlet connected with the chamber 10 via a valve V1. An outlet from chamber 10 is connected via a valve V2 with an extractor, whereby with valves V2 and V1 open and valve V3 closed, saturated air can be drawn into chamber 10 whilst with valves V2 and V3 open and valve V1 closed dry air can be drawn into chamber 10, to adjust the humidity in the chamber 10 in either case. A relative humidity sensing probe 12 and a temperature sensing probe 14 within chamber 10 pass signals to a computer 24 which controls valves V1, V2 and V3, whereby feed-back regulation of the humidity in chamber 10 can be achieved.

7 Claims, 1 Drawing Sheet

APPARATUS FOR, AND METHOD OF, PROVIDING AN ATMOSPHERE OF PREDETERMINED HUMIDITY

THIS INVENTION relates to an apparatus for and a method of providing an atmosphere of predetermined humidity, for example for use in calibrating humidity measuring instruments or for storing items which require to be kept at a particular humidity.

A number of methods are available for providing atmospheres of known humidities. One traditional method is to mix wet air with differing quantities of dry air to produce different humidities. Another method is to maintain the volume of air concerned over a solution of saturated salts and in moisture equilibrium with the latter. These known methods are expensive and/or time consuming.

It is among the objects of the present invention to provide an improved apparatus for and method of, providing an atmosphere of predetermined humidity.

According to one aspect of the invention there is provided apparatus for providing an atmosphere of predetermined humidity, comprising a chamber for containing such atmosphere, means for supplying dry air and moist air to said chamber and means for drawing air from said chamber, control means for controlling the relative amounts of dry air and moist air supplied to the chamber to afford a coarse adjustment of humidity, and fine control means including moisture removal means for removing moisture from the atmosphere in said chamber, the apparatus including a control facility controlling said dry and moist air supplying means, and said means for drawing air from the chamber, and/or controlling said moisture removal means, said humidity sensing means providing its output signal to said control facility.

An embodiment of the invention is described below, by way of example, with reference to the accompanying schematic block diagram.

Referring to the block diagram, the apparatus includes a small chamber 10 within which are placed a reference dewpoint or relative humidity measuring probe 12 and a temperature sensing probe 14.

Exposed within the chamber, for example forming one wall of the chamber, or part of one wall, is a surface, indicated at 16, of which the temperature can be closely controlled, and which, more particularly, can be cooled with respect to its surroundings, for example thermoelectrically using a Peltier cooling device (indicated schematically at 18) or by passing a cool liquid through passages within a metal body affording the surface 16. If desired, several walls of the chamber 10 may have such surfaces 16 which can be controllably cooled in the manner indicated.

The chamber 10 is connected via a valve V2 with an air extractor or suction pump, via a valve V1 with an air saturator 20 and via a valve V3 with a source 22 of dry air. When valves V1 and V2 are open and the extractor or pump operated, dry air is drawn from the source 22, via an air conduit into the saturator 20 and, in passing through the saturator 20, becomes saturated with moisture. The saturated air then passes, via the valve V1, into the chamber 10.

The valves V1, V2 and V3 are electrically operable valves controlled by a computer 24, for example a microcomputer, having a keyboard 26 and a display 28. The humidity probe 12 and the temperature probe 14 provide electrical signals, significant of the respective values sensed to the computer 24. In practice, for precision, the humidity sensor may operate by measurement of dewpoint, for example in a repeating cycle.

The system functions as follows:

If a known humidity (or dewpoint) is required, this number is simply entered into the computer 24 by the action of the keyboard 26. The computer then determines, on the basis of the signals from the probe 12, whether the atmosphere already present in chamber 10 needs to be humidified or de-humidified. If the atmosphere needs to be humidified, then valves V1 and V2 are opened and saturated air flows into the chamber until such time as there is a slight excess of water vapour in the measuring chamber (i.e. if the required dewpoint was 5° C., saturated water vapour would be allowed to flow until the dewpoint was say, 10° C.). V1 and V2 are then closed. Conversely, if the chamber moisture content is too high, then V1 is shut and V2 and V3 are opened to allow dry air to flow through the chamber until the moisture content is merely slightly in excess of the desired amount.

Thus, at this stage there is confined within chamber 10 an amount of air at a dewpoint slightly higher than the required dewpoint. The surface 16 is now cooled until condensation forms on the surface and the surface 16 is kept cool until sufficient condensation is deposited on the surface 16 (and thus removed from the atmosphere within chamber 10) to dry the atmosphere in chamber 10 down to the desired dewpoint, as sensed by the probe 12. The digital computer 24 thus forms part of a control loop which keeps the temperature of surface 16 adjusted to remove precisely the amount of water from the atmosphere in the chamber 10 to keep the dewpoint at precisely the required dewpoint. The temperature of the chamber is constantly measured by the temperature measuring probe 14 and both these signals of temperature and dewpoint are fed to the computer 24 which can calculate the relative humidity or the moisture content of the atmosphere as required, and, for example, display the calculated value on display 28. Indeed, facilities preferably exist in the software programming of the instrument to allow the desired control point to be entered either as dewpoint or relative humidity or moisture content. The overall temperature of the chamber 10 may be regulated, for example utilising further heating and/or cooling means (not shown) controlled by the computer 24 in a further control loop, to minimise the extent to which moisture must be added to or removed from the atmosphere in the chamber to maintain a predetermined relative humidity.

I claim:

1. An apparatus for providing an atmosphere of predetermined humidity, comprising:

a chamber for containing the atmosphere;

means for supplying dry air and moist air to said chamber;

means for drawing air from said chamber;

control means for controlling the amounts of dry air and moist air supplied to the chamber to afford a course adjustment of humidity;

fine control means including moisture removal means for removing moisture from the atmosphere in said chamber, said moisture removal means including a cooled surface within said chamber upon which condensation of moisture from said atmosphere can take place to remove such moisture from said atmosphere, and means for controlling the temperature of said surface to control moisture removal by said moisture removal means;

a control facility controlling said dry and moist air supplying means, and said means for drawing air from the chamber, and/or controlling said moisture removal means; and humidity sensing means with said chamber providing an output signal to said control facility.

2. The apparatus of claim 1 wherein said cooled surface forms at least part of one wall of said chamber.

3. The apparatus of claim 1 wherein said cooled surface is cooled thermoelectrically using a Peltier cooling device.

4. The apparatus of claim 1 including an outlet from said chamber connectable with an air extractor, a first valve in said outlet, a source of dry air, an air saturator, air conduit means connecting said dry air source with said air saturator, further air conduit means connecting said air saturator with said chamber, a second valve in said further air conduit means, and by-pass conduit means connecting said dry air source with said chamber and by-passing said air saturator and said second valve, and a third valve in said by-pass conduit means, said control facility controlling said first, second and third valves.

5. The apparatus of claim 1 wherein said control facility comprises a digital computer.

6. The apparatus of claim 5 including temperature sensing means within said chamber, means connecting said temperature sensing means with said computer, display means controlled by said computer, said computer being operable to calculate from temperature and humidity sensed by said temperature means and said humidity sensing means the relative humidity or moisture content of the atmosphere in said chamber, and to display the calculated value on said display means.

7. An apparatus for providing an atmosphere of predetermined humidity, comprising;

a chamber for containing the atmosphere;

means for supplying dry air and moist air to said chamber;

means for drawing air from said chamber;

control means for controlling the amounts of dry air and moist air supplied to the chamber to afford a course adjustment of humidity;

fine control means including moisture removal means for removing moisture from the atmosphere in said chamber;

a computer for controlling said dry and moist air supplying means, and said means for drawing air from the chamber, and/or controlling said moisture removal means; and humidity sensing means within said chamber providing an output signal to said computer.

* * * * *